(12) United States Patent
Ayyagari et al.

(10) Patent No.: US 8,130,739 B2
(45) Date of Patent: *Mar. 6, 2012

(54) METHODS AND SYSTEMS FOR FREQUENCY AND TIME DIVISION ACCESS

(75) Inventors: Deepak Ayyagari, Vancouver, WA (US); Wai-Chung Chan, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/684,882

(22) Filed: Jan. 8, 2010

(65) Prior Publication Data

US 2010/0111096 A1    May 6, 2010

Related U.S. Application Data

(63) Continuation of application No. 11/089,759, filed on Mar. 23, 2005, now Pat. No. 7,672,232, which is a continuation of application No. PCT/US2004/036798, filed on Nov. 5, 2004.

(60) Provisional application No. 60/518,036, filed on Nov. 7, 2003, provisional application No. 60/518,224, filed on Nov. 7, 2003, provisional application No. 60/518,237, filed on Nov. 7, 2003, provisional application No. 60/518,574, filed on Nov. 7, 2003, provisional application No. 60/537,492, filed on Jan. 19, 2004, provisional application No. 60/573,353, filed on May 21, 2004.

(51) Int. Cl.
*H04W 4/00*    (2009.01)

(52) U.S. Cl. ........................................ 370/341; 370/458
(58) Field of Classification Search ................. 370/436, 370/230, 235, 395.41, 458, 468, 241
See application file for complete search history.

(56) References Cited

U.S. PATENT DOCUMENTS

| | | | |
|---|---|---|---|
| 4,313,212 A | | 1/1982 | Whitlock |
| 5,402,413 A | | 3/1995 | Dixon |
| 5,495,483 A | * | 2/1996 | Grube et al. ............... 370/341 |
| 5,541,955 A | | 7/1996 | Jacobsmeyer |
| 5,596,439 A | | 1/1997 | Dankberg et al. |
| 5,644,573 A | | 7/1997 | Bingham et al. |
| 5,828,963 A | | 10/1998 | Grandhi et al. |
| 5,949,769 A | | 9/1999 | Davidson et al. |
| 6,038,455 A | | 3/2000 | Gardner et al. |

(Continued)

FOREIGN PATENT DOCUMENTS

WO    WO00/74322    7/2000

OTHER PUBLICATIONS

International Application No. PCT/US04/036797 International Search Report.

(Continued)

*Primary Examiner* — Kevin C Harper
*Assistant Examiner* — Sai-Ming Chan
(74) *Attorney, Agent, or Firm* — Krieger Intellectual Property, Inc.; Scott C. Krieger

(57) ABSTRACT

Aspects of the present invention relate to methods and systems for managing and allocating bandwidth in a communication medium. Some aspects relate to the determination of bit usage patterns for use in allocating bandwidth. Some aspects relate to the further determination of a derived usage pattern from the bit usage patterns and allocation of tone-slots within the derived usage pattern.

18 Claims, 13 Drawing Sheets

U.S. PATENT DOCUMENTS

| | | | |
|---|---|---|---|
| 6,084,886 | A | 7/2000 | Dehner et al. |
| 6,097,700 | A | 8/2000 | Thornberg et al. |
| 6,167,095 | A | 12/2000 | Furukawa et al. |
| 6,233,240 | B1 | 5/2001 | Barbas et al. |
| 6,278,723 | B1 | 8/2001 | Meihofer et al. |
| 6,278,883 | B1 | 8/2001 | Choi |
| 6,400,819 | B1 | 6/2002 | Nakano et al. |
| 6,408,033 | B1 | 6/2002 | Chow et al. |
| 6,480,506 | B1 | 11/2002 | Gubbi et al. |
| 6,618,366 | B1 | 9/2003 | Furukawa et al. |
| 6,668,175 | B1 | 12/2003 | Almgren et al. |
| 6,674,750 | B1 | 1/2004 | Castellano |
| 6,700,875 | B1 | 3/2004 | Schroeder et al. |
| 6,718,393 | B1 | 4/2004 | Aditya |
| 6,741,554 | B2 | 5/2004 | D'Amico et al. |
| 6,754,176 | B1 | 6/2004 | Gubbi et al. |
| 6,763,384 | B1 | 7/2004 | Gupta |
| 6,795,418 | B2 | 9/2004 | Choi |
| 6,826,186 | B1 | 11/2004 | Ditta et al. |
| 6,850,981 | B1 | 2/2005 | Ho et al. |
| 6,865,609 | B1 | 3/2005 | Gubbi et al. |
| 6,877,043 | B2 | 4/2005 | Mallory et al. |
| 6,891,841 | B2 | 5/2005 | Leatherbury et al. |
| 6,934,554 | B2 | 8/2005 | Mizuno et al. |
| 6,934,752 | B1 | 8/2005 | Gubbi |
| 6,947,748 | B2 | 9/2005 | Li et al. |
| 7,050,452 | B2 | 5/2006 | Sugar et al. |
| 7,072,315 | B1 | 7/2006 | Liu et al. |
| 7,076,220 | B2 | 7/2006 | Backes et al. |
| 7,110,366 | B2 | 9/2006 | Hulyalkar et al. |
| 7,233,991 | B2 | 7/2007 | Adhikari |
| 7,269,185 | B2 | 9/2007 | Kirby et al. |
| 7,295,518 | B1 | 11/2007 | Monk et al. |
| 7,298,289 | B1 | 11/2007 | Hoffberg |
| 7,315,573 | B2 | 1/2008 | Lusky et al. |
| 2001/0037412 | A1 | 11/2001 | Miloushev et al. |
| 2002/0022483 | A1 | 2/2002 | Thompson et al. |
| 2002/0062472 | A1 | 5/2002 | Medlock et al. |
| 2002/0094011 | A1 | 7/2002 | Okumura et al. |
| 2002/0133589 | A1 | 9/2002 | Gubbi et al. |
| 2002/0137467 | A1 | 9/2002 | Tzannes |
| 2002/0159418 | A1 | 10/2002 | Rudnick et al. |
| 2002/0163928 | A1 | 11/2002 | Rudnick et al. |
| 2003/0002529 | A1 | 1/2003 | Kurdzinski et al. |
| 2003/0012166 | A1 | 1/2003 | Benveniste |
| 2003/0012167 | A1 | 1/2003 | Benveniste |
| 2003/0016732 | A1 | 1/2003 | Miklos et al. |
| 2003/0040319 | A1 | 2/2003 | Hansen et al. |
| 2003/0067892 | A1 | 4/2003 | Beyer et al. |
| 2003/0081603 | A1 | 5/2003 | Rune |
| 2003/0084283 | A1 | 5/2003 | Pixton |
| 2003/0126536 | A1 | 7/2003 | Gollamudi et al. |
| 2003/0147368 | A1 | 8/2003 | Eitan et al. |
| 2003/0161268 | A1 | 8/2003 | Larsson et al. |
| 2003/0161340 | A1 | 8/2003 | Sherman |
| 2003/0174665 | A1 | 9/2003 | Benveniste |
| 2003/0181165 | A1 | 9/2003 | Sugar et al. |
| 2003/0224787 | A1 | 12/2003 | Gandolfo |
| 2003/0231621 | A1 | 12/2003 | Gubbi et al. |
| 2003/0231715 | A1* | 12/2003 | Shoemake et al. ............ 375/267 |
| 2004/0001429 | A1 | 1/2004 | Ma et al. |
| 2004/0013102 | A1 | 1/2004 | Fong et al. |
| 2004/0013135 | A1 | 1/2004 | Haddad |
| 2004/0022181 | A1 | 2/2004 | Coffey |
| 2004/0053621 | A1 | 3/2004 | Sugaya |
| 2004/0058686 | A1 | 3/2004 | Odman |
| 2004/0062229 | A1 | 4/2004 | Ayyagari et al. |
| 2004/0066738 | A1 | 4/2004 | Stopler |
| 2004/0100897 | A1 | 5/2004 | Shattil |
| 2004/0125786 | A1 | 7/2004 | Fuchs |
| 2004/0136393 | A1 | 7/2004 | Insua et al. |
| 2004/0166869 | A1 | 8/2004 | Laroia et al. |
| 2004/0174851 | A1* | 9/2004 | Zalitzky et al. ............... 370/338 |
| 2004/0184398 | A1 | 9/2004 | Walton et al. |
| 2004/0224634 | A1 | 11/2004 | Kim |
| 2004/0224676 | A1 | 11/2004 | Iseki |
| 2005/0030890 | A1 | 2/2005 | Benco et al. |
| 2005/0192037 | A1 | 9/2005 | Nanda et al. |
| 2006/0039275 | A1 | 2/2006 | Walton et al. |
| 2006/0114826 | A1 | 6/2006 | Brommer |
| 2006/0227706 | A1 | 10/2006 | Burst |
| 2006/0250973 | A1 | 11/2006 | Trott |
| 2007/0211786 | A1 | 9/2007 | Shattil |
| 2008/0039148 | A1 | 2/2008 | Rudolf |

OTHER PUBLICATIONS

International Application No. PCT/US04/036797 International Preliminary Examination Report.
International Application No. PCT/US04/036798 International Search Report.
International Application No. PCT/US04/036798 International Search Report.
International Application No. PCT/US04/036799 International Preliminary Examination Report.
International Application No. PCT/US04/036799 International Search Report.
International Application No. PCT/US04/036786 International Preliminary Examination Report.
International Application No. PCT/US04/036786 International Search Report.
International Application No. PCT/US04/036796 International Preliminary Examination Report.
International Application No. PCT/US04/036796 International Search Report.
International Application No. PCT/US04/036969 International Preliminary Examination Report.
International Application No. PCT/US04/036969 International Search Report.
International Application No. PCT/US04/036785 International Preliminary Examination Report.
International Application No. PCT/US04/036785 International Search Report A.
International Application No. PCT/US04/036785 International Search Report B.
U.S. Appl. No. 11/089,882—Office Action dated May 21, 2008.
U.S. Appl. No. 11/089,792—Office Action dated Feb. 21, 2006.
U.S. Appl. No. 11/089,792—Office Action dated Mar. 28, 2006.
U.S. Appl. No. 11/089,792—Office Action dated Nov. 6, 2006.
U.S. Appl. No. 11/089,629 Office Action dated Jul. 23, 2008.
U.S. Appl. No. 11/089,629 Office Action dated Jan. 16, 2009.
U.S. Appl. No. 11/089,792—Office Action dated Apr. 25, 2007.
U.S. Appl. No. 11/089,792—Office Action dated Aug. 8, 2007.
U.S. Appl. No. 11/090,549—Office Action dated Dec. 12, 2007.
U.S. Appl. No. 11/098,623 Office Action dated Aug. 15, 2008.
U.S. Appl. No. 11/89,626 Office Action dated Feb. 2, 2009.
U.S. Appl. No. 11/089,759 Office Action dated Aug. 4, 2008.
U.S. Appl. No. 11/089,759 Office Action dated Jan. 26, 2009.
U.S. Appl. No. 11/089,882 Office Action dated Feb. 24, 2009.
U.S. Appl. No. 11/089,756 Office Action dated Jul. 21, 2008.
U.S. Appl. No. 11/089,756 Office Action dated Dec. 24, 2008.
U.S. Appl. No. 11/090,549 Office Action dated Jul. 10, 2008.
U.S. Appl. No. 11/90,549 Office Action dated Jan. 5, 2009.
U.S. Appl. No. 11/089,756—Office Action dated—Sep. 10, 2009.
U.S. Appl. No. 11/089,759—Notice of Allowance dated Oct. 8, 2009.
U.S. Appl. No. 11/089,792—Notice of Allowance dated Jan. 28, 2008.
U.S. Appl. No. 11/090,549—Office Action dated Dec. 30, 2009.
U.S. Appl. No. 11/089,623—Office Action dated Sep. 17, 2009.
U.S. Appl. No. 11/090,549—Office Action dated Jul. 7, 2009.
U.S. Appl. No. 11/089,882—Office Action dated Oct. 8, 2009.
Japanese Office Action JP2006-538485 corresponding to U.S. Appl. No. 11/090,549 which has technical similarities to the present application.
European Search Report for PCT/US 2004036785 corresponding to U.S. Appl. No. 11/089,629 which has technical similarities to the present application.

* cited by examiner

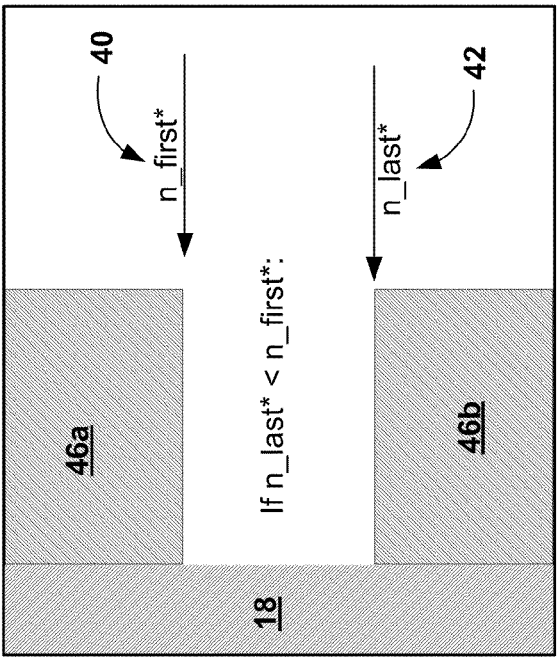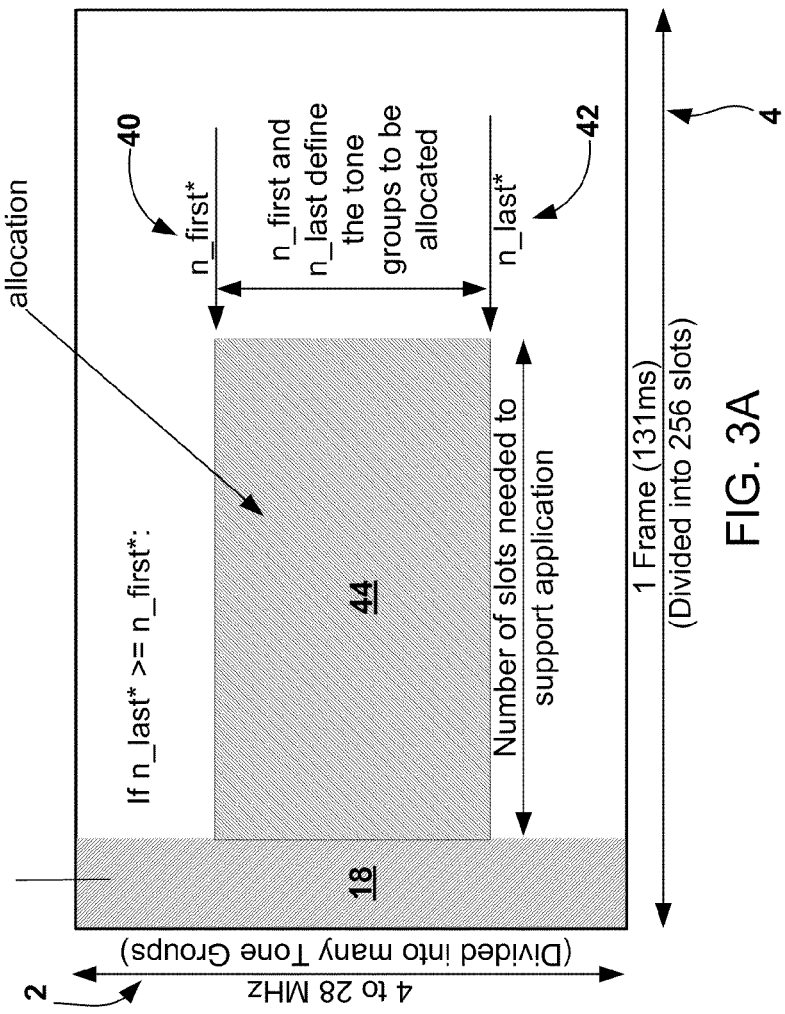
FIG. 3B
FIG. 3A

METHODS AND SYSTEMS FOR FREQUENCY AND TIME DIVISION ACCESS

RELATED REFERENCES

This application is a continuation of U.S. patent application Ser. No. 11/089,759, filed on Mar. 23, 2005 now U.S. Pat. No. 7,672,232; U.S. patent application Ser. No. 11/089,759 is a continuation of PCT/US04/36798 filed on Nov. 5, 2004; PCT/US04/36798 claims the benefit of the following U.S. Provisional Patent Applications:

U.S. Provisional Patent Application No. 60/518,036, filed on Nov. 7, 2003
U.S. Provisional Patent Application No. 60/518,224, filed on Nov. 7, 2003
U.S. Provisional Patent Application No. 60/518,237, filed on Nov. 7, 2003
U.S. Provisional Patent Application No. 60/518,574, filed on Nov. 7, 2003
U.S. Provisional Patent Application No. 60/537,492, filed on Jan. 19, 2004
U.S. Provisional Patent Application No. 60/573,353, filed on May 21, 2004

BACKGROUND OF THE INVENTION

Some digital communication methods can allocate communication bandwidth (BW) by dividing the available bandwidth into frequency ranges or tones. In some of these methods, the tones may be further divided into time slots. One example of these methods is Orthogonal Frequency Division Multiplexing (OFDM). OFDM methods provide for bandwidth and bandwidth management in the frequency domain and the time domain. Bandwidth allocation may also be referred to as scheduling or Medium Access Control (MAC). OFDM access or scheduling may be abbreviated as OFDMA.

In frequency-divided communication systems, the available bandwidth may be apportioned among multiple devices and applications by a network control mechanism. This may be done using a priority system that attempts to provide a level of Quality of Service (QoS) for some devices or applications. In most communication systems, access control and bandwidth management are performed only in the frequency domain, known as Frequency Domain Management (FDM) or in the time domain, known as Time Domain Management (TDM). However, there are no current systems that employ a combination of FDM and TDM. A system that combines FDM and TDM typically is difficult to design and implement, is complex and is computationally intensive.

BW Scheduling and Access Control (AC) methods in OFDM PHY may use the Time domain as in TDMA systems or the Frequency domain as in FDMA. Time and Frequency domain AC and scheduling have well developed theory. Various schedulers exist for TDMA and FDMA systems. Multi-tone systems such as FFT or Wavelet OFDM and DMT are widely adopted today. However, the scheduling and access control in these systems is usually FDM or TDM based.

The OFDMA scheduling problem has been formulated in theoretical terms and studied in research circles. However the constraints and assumptions chosen simplify the problem to allow for analytical tractability. Some unrealistic assumptions that are used quite commonly are:

1. Gaussian channels. But, the powerline channel, in reality, is not Gaussian at all.
2. All users require the same data rate. To the contrary, in many networks a variety of applications (AV, IP) have a wide range of QoS requirements
3. Transmit power and energy in individual devices is limited. This is true for mobile/cellular devices but not for powerline communication devices
4. Number of devices in the network is limited (2 in some cases).
5. Model BW allocation on the downlink only (a central station to many devices) and not on the uplink.

Most of the approaches divide the BW allocation problem into a 2 step process: Resource Allocation and Sub-carrier Allocation. Resource Allocation determines the number of tones or frequencies that the new request needs. Sub-carrier allocation identifies the actual tones from the set of available tones that would be allocated to the request. Based on differing assumptions and constraints, different algorithms have been proposed for these allocation schemes.

The algorithms that come closest to achieving optimality (defined in the sense of maximizing overall network capacity) are computationally intense ($O(N^3)$ where N=Number of Tones). Other algorithms are sub-optimal and their performance in real systems is not known. Further it is not clear that the 2 step approach is the right way to solve the problem. This is because it is impossible to accurately determine exactly the number of tones required (resource allocation) without prior knowledge of which tones are being assigned (sub-carrier allocation) to the request from the set of all available tones.

These methods also do not model realistic problems such as fragmentation of the frequency-time map resulting from different request generation patterns (depends on mix of applications in network), protocol overhead and performance degradation from making active requests change tones, etc. Embodiments of the present invention address these problems and constraints.

BRIEF SUMMARY OF THE INVENTION

Embodiments of the present invention comprise methods and systems for allocating bandwidth using combinations of FDM and TDM.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 3A is a diagram illustrating an exemplary Scheduler 1 allocation on a tone map;

FIG. 3B is a diagram illustrating an alternative exemplary Scheduler 1 allocation on a tone map;

DETAILED DESCRIPTION OF PREFERRED EMBODIMENTS

Figure 1:
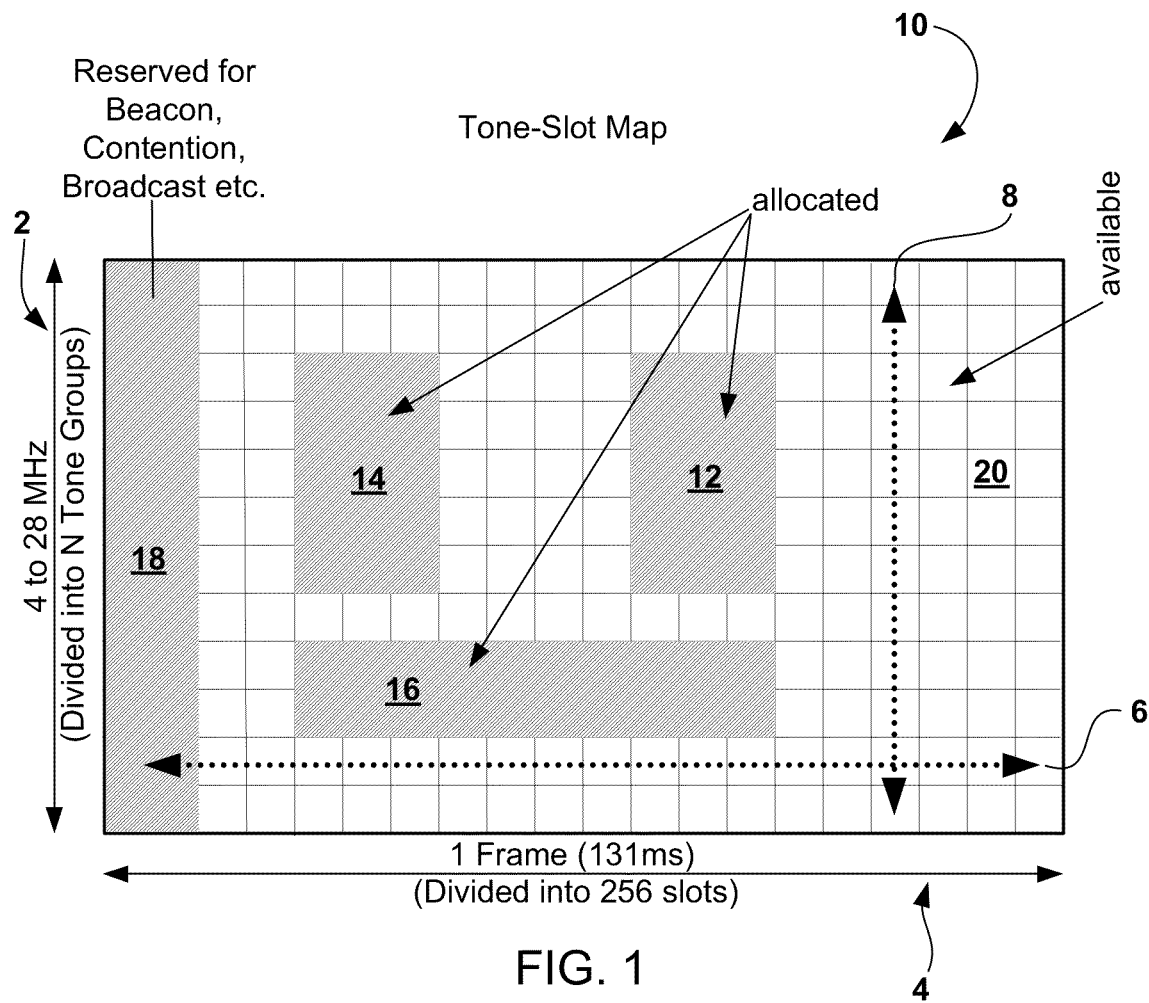
FIG. 1 is a diagram showing an exemplary tone map.

Embodiments of the present invention comprise systems and methods for allocation of bandwidth using TDM and FDM techniques. Many of these embodiments will be described with reference to an OFDM system, however, it should be noted that other communications systems that allow for combinations of TDM and FDM may be used in conjunction therewith. The term Joint Frequency-Time Division Medium Access (JFTDMA) may refer to any system or method that uses both TDM and FDM for allocation purposes. JFTDMA comprises OFDMA and other methods and systems.

JFTDMA may provide higher utilization of bandwidth in channels whose response is frequency selective and time varying and when channel response between device pairs varies significantly. In systems that support QoS guarantees for multimedia applications but have limited bandwidth, JFTDMA MACs may deliver higher throughput.

In some embodiments of the present invention, system-wide information, such as the quality of the links between any two devices in a network, may be used to determine which tones or frequencies and which time slots are best assigned to specific devices. These devices may make bandwidth (BW) requests that specify a data rate requirement and a maximum tolerable delay for each packet.

Embodiments of the present invention may employ different algorithms with varying performance and complexity. For example, in some embodiments, only a contiguous block of tones may be allocated. In other embodiments, any combination of tones may be allocated. These embodiments may use empirical information collected throughout a network and may perform without placing any constraints on channel type, number of devices and other parameters. Embodiments of the present invention typically have acceptably low implementation complexity and generally avoid the assumptions made by prior art systems.

Though some known systems use OFDM transmission technologies (PHY), the MACs riding on this physical layer technology are usually FDMA, TDMA or some variant of either. It should be noted that CDMA or Code Division Multiple Access methods operate over Spread Spectrum Physical Layers.

Embodiments of the present invention utilize algorithms for doing BW scheduling in a JFTDMA system such as an OFDMA system. Some embodiments do BW allocation in both the frequency and time domain, made possible by an OFDM physical transmission technology. These algorithms are not specific to a particular channel such as the power line channel or the wireless channel, and are applicable to other media.

Inputs for these embodiments may comprise: a BW request specifying a data rate requirement and/or a delay requirement, frame configuration or tone map data (identifying used and free time slots in a frame for each tone), a Bit Loading estimate (max bits/symbol that may be used on each tone for a predetermined error probability), and system parameters such as the number of tones, the number of slots/frame, etc.

The output the Scheduler is a BW allocation, if the request is accepted. The BW allocation specifies the tones (or tone group, a set of tones) and time slots to be used by the devices that generated the request. BW Allocations may be specified in different ways. Each method of specifying the allocation may have an impact on the following:

Memory requirements in the system hardware

Signaling/Protocol overhead during BW negotiations or connection overhead.

Some embodiments of the present invention may be described with reference to an exemplary embodiment, which is described as Scheduler 1 (Sch-1). These scheduling methods exploit the varying channel characteristics between different devices in the network by choosing the set of tones that best suit the request from the set of free tones in the tone map. This particular embodiment is an FDM only approach to scheduling. In these embodiments, each BW request can use the assigned tones for the entire duration of the frame (all slots in the frame). The BW allocation consists of a single contiguous block of tones. The BW allocation may be specified by the first tone id and the last tone id in the tone block assigned to the request. The advantages of this method include:

Very low memory requirements

Very low signaling overhead

Low computational complexity for the algorithm in the BW controller.

Some of these embodiments may have sub-optimal performance as the time domain is not exploited, and a contiguous tone block may not be the best set of tones for some applications (fewest tones to meet the request is the best).

Some embodiments of the present invention may be described with reference to a second exemplary embodiment, which may be referred to as Scheduler 2 (Sch-2). These embodiments may exploit the varying channel characteristics between any two paths like Scheduler 1 embodiments. However, unlike Sch-1, Sch-2 may choose the best tones from the set of free tones and does not require the assigned set of tones to only carry contiguous tones. Further Sch-2 assigns only the required number of time slots within a time frame for each assigned tone to the request and the remaining time slots on each tone may be used for other requests. The time slot assignment can be made in consideration of the delay constraints specified in the BW request. Thus Sch-2 is a true JFTDMA or OFDMA scheduler as it makes BW allocations in both frequency and time.

BW allocations in some Sch-2 embodiments may be made by communicating the entire tone map. An allocation may be defined as: Allocation $A(g,s)=1$, if a tone group, g and slot, s are assigned to a request, otherwise the Allocation $A(g,s)=0$. However, other methods may be used to signify bandwidth allocation. Sch-2 embodiments can be very memory intensive, require more signaling overhead and have higher computational complexity than other methods. However, Sch-2 embodiments are "single request optimal" (i.e., they assign the lowest number of time slots and tones to satisfy each request). It is not "globally optimal" (i.e., allocating the lowest number of time slots and tones to ALL active requests—requests with active allocations).

Some embodiments of the present invention may be described with reference to a third exemplary embodiment, which may be referred to as Scheduler 3 (Sch-3). In many systems, the number of tones or tone groups that can be allocated is limited by the protocol. Sch-3 embodiments are designed to find the "best" allocations with the constraint that the BW allocation cannot carry more than M tone blocks. A Tone BLOCK may be represented as a 1×N vector where the $n^{th}$ entry=1 if the tone group n is allocated and the $n^{th}$ entry=0 if it is not allocated to a request. A tone group may contain one or more tones. Additionally, all allocated tone groups may be constrained to a contiguous block in some embodiments.

Besides the real constraint on the allocation, it is evident that use of Sch-2 embodiments may result in "fragmentation" of the tone map. This may occur as allocations are requested, granted and expire. As this occurs, the tone map ends up with many holes of free tone slots amidst pockets of used tone slots. This fragmentation can have a negative impact. Sch-3 embodiments, by constraining the allocation to have a limited number of blocks, restricts the fragmentation of the tone map, reduces memory requirements and reduces signaling overhead compared to Sch-2 embodiments. As a result of the reduction in fragmentation, Sch-3 embodiments may provide better utilization and QoS performance (delay constraint support) than Sch-2 embodiments even though Sch-3 embodiments are not 'single request optimal.'

In many environments such as those used by power line and wireless communication systems, the communication channel is frequency selective and time variant. Further, the channel between different device pairs may exhibit different characteristics. Sch-1 embodiments exploit the variability in the channel between the two devices making the BW request, by choosing those tones that provide the best performance (highest data rate). The choice of the tones may be based, in part, on the Bit Loading Estimate (BLE), which may be determined by known methods. The BLE shows the maximum number of bits/symbol that can be transmitted on a given tone. In these embodiments, BLEs may be used to provide frequency division access, time division access and dual frequency-time division access and BW scheduling for multi-tone PHYs.

Sch-1 embodiments have very low hardware requirements, protocol overhead and implementation complexity compared to all other OFDMA algorithms. Sch-1 embodiments limit fragmentation of the Frequency-time Tone-Slot Map (or abbreviated as Tone Map) by assigning the best available single contiguous block of tones. Single tone block allocation reduces loss of BW due to guard tones, common in OFDM PHYs.

Sch-2 embodiments may also use BLE estimates to determine frequency and time slot assignments for each request. Sch-2 embodiments make BW assignment in both frequency (tones) and time (time slots). No known systems use BLEs to provide dual frequency-time division access and BW scheduling for multi-tone (OFDM) PHYs. Sch-2 embodiments may make frequency and time slot assignments based on the data rate as well as delay requirements.

Sch-2 embodiments may be "single-request-optimal," wherein Sch-2 embodiments find and allocate the tones with the highest BLEs and thus use the minimum number of tones and time slots to service the request. Some Sch-2 embodiments may not be globally optimal because a globally optimal solution may require a re-assignment of ALL existing active allocations, an expensive operation. Typically, known systems are not single request optimal. Sch-2 embodiments generally do not require complex assumptions and constraints, such as peak transmit power, a flat or Gaussian channel, a limited data rate for each device or limiting the number of devices in the network.

Sch-3 embodiments may constrain the BW allocation to a maximum of M Blocks. In some embodiments, the BW allocation in a multi-tone Tone MAP is constrained to a certain number of tone-slot blocks. Sch-3 embodiments are intended to reduce 'fragmentation' of the tone-Slot Map. This has significant benefits such as reduction of guard times and guard slots (guard overhead), reducing message sizes (signaling overhead), improved ability to support half duplex operations, and overall throughput (as more requests can be successfully fitted into the Tone Map). No known methods are designed to be close to single request optimal, nor do they attempt to limit fragmentation of the Tone Map through a constraint on the number of blocks in the allocation. Sch-3 embodiments serve to encode the BW allocation in an efficient manner (from memory and signaling overhead point of view). Some Sch-3 embodiments have the novel attributes of Sch-2 embodiments, however, some Sch-3 embodiments may not be single request optimal.

The scheduling algorithms of embodiments of the present invention are applicable in systems with multi-tone PHYs. The number of tones or frequencies is a configurable system parameter. Typically, a device requesting BW can be assigned one or more tones In these systems, time is typically slotted and framed. The frame duration, slot duration and number of slots/frame are system parameters that are configurable. In many embodiments, a device requesting BW can be assigned one or more slots for each tone assigned.

Multiple devices within a network share the BW. Generally, there is no limit on the number of devices in the Network.

In some embodiments of the present invention, BW assignments are made by a Central Controller (CC) or master that knows the state of the channel between any two devices in its controlled networks and arbitrates among devices that share the available BW. The CC may obtain channel information by obtaining the BLE. The controller of embodiments of the present invention may run the scheduling functions in response to BW requests received from devices in the network.

In some embodiments, there is no limit of the transmit power of the individual devices. The transmit power may be constrained by either device limitations such as is the case in wireless devices. The transmit power may also be constrained by the out of band emissions in neighboring frequencies as may be the case in powerline devices. The peak power constraint may be reflected in the computation of the Bit Loading Estimate (BLE) for each tone for each device pair.

The Bit Loading Estimate may be defined as the maximum modulation density (bits/symbol) that can be supported on any given tone. The BLE assumes a certain acceptable probability of error and a certain maximum transmission power. The BLE is only an approximation as it does not entirely account for the varying interference environment. Interference affects the max. bits/symbol that can digitally modulate a given tone, in different ways depending on the source of the interference, its proximity to the device, and the characteristics of the PHY. In some embodiments of the present invention, the authority controlling BW allocations (Central Controller or Master) knows the BLE estimate for all tones in the Tone Map, for the pair of devices that make the BW request. In some embodiments, for increased performance, the Controller needs to know the BLEs for all tones for all the device pairs that are a part of the network. The BLEs often have to be updated as the channel conditions vary.

The multi-tone PHY may require guard time slots and/or guard tones (unused time slots and frequencies) between allocations made to different devices. Embodiments of the present invention may comprise this function.

Embodiments of the present invention may accommodate devices in the network that operate in a half-duplex fashion. Embodiments may also accommodate cases where both devices operate in a full duplex fashion (Transmit and receive at the same time), but this requires a different form for the BW allocation.

The BW allocations consist of frequency tone and time slot assignments from the set of all tones and slots within a time frame. An example of a Tone-Slot Map or Tone Map (TM), for brevity, is provided in FIG. 1.

In this exemplary Tone-Slot Map 10, Frequencies or tones are represented on a vertical axis 2 and time slots are represented along a horizontal axis 4. Each map 10 represents a frame comprising a group of available tones represented as rows, such as tone 6. The map 10 is further divided into columns, which represent time slots, such as slot 8. Accordingly, a BW allocation is defined by the intersection of one or more tones and one or more slots, such as allocations 12, 14 or 16. Portions of the TM, such as reserved block 18, may be reserved for broadcast periods, contention periods, beacon periods, other coordination or management functions or for some other purpose. Areas 20 of the TM that are not allocated are generally available for use.

Frequencies or tones may be collected in "groups" or contiguous sets of tones. The number of tones in a group may be 1 or more. This is a configurable system parameter. BW allocations to requests may be made in units of tone-groups and time-slots as in allocations 12, 14 & 16. As the number of groups in the TM grows, the computation complexity of the proposed schedulers also grows. For example, if the system has a total of 500 tones, they may be grouped into 20 groups of contiguous tones with each group carrying 25 tones. In one representation, the TM can be viewed as a table whose entries are defined as follows TM (group i, slot j)=1 only if the tone group i is free or un-assigned during time slot j. Else TM (group i, slot j)=0.

Embodiments of the present invention may use a bandwidth request as input. A

BW request may be issued by a device to the controlling authority arbitrating access to the medium. A BW request may comprise the following information:

Identification of source and destination devices.
Data rate specification (number of bytes/frame).
Delay specification (max. number of time slots).

Embodiments of the present invention may also use a frame configuration or Tone-Slot Map as input. This may comprise identification of used and free time slots in frames for each tone group.

Embodiments of the present invention may also utilize a BLE (Bit Loading Estimate) of each tone for the particular Source-Destination link. A BLE for every link in the system may be computed by the Sounding function. BLE estimates may be maintained in the Central Controller.

Controller input may also comprise system parameters, such as Frame size, Number of slots/frame, number of OFDM symbols/slot, Number of tone groups, etc.

When a request is received, the Central Controller (CC) of embodiments of the present invention may evaluate the BW request against the current BW usage as shown by the Tone Map. If there is enough free BW available to honor the request and meet the data rate and delay requirements specified in the request, the CC may generate a BW Allocation. The BW Allocation specifies the tones (or tone group) and time slots to be used by the devices that generated the request. BW Allocations may be specified and conveyed by the CC to the devices in different ways. The form of the BW allocation is protocol and scheduler dependent. The form of the allocation may impact the memory requirements in the hardware (HW) as well as the signaling overhead during connection establishment or BW request procedures. Consequently, different scheduler embodiments have different impacts on system requirements or performance.

Various embodiments of the present invention may specify allocations in different ways. In Scheduler 1 embodiments, the BW Allocation may be specified by first tone (or group) id and last tone (or group) id in the tone block. Typically, no Slot assignments are specified. Devices can use all the specified tones (groups) for all slots in a frame. This format requires very low memory and signaling overhead. In Scheduler 2 embodiments, the BW Allocation may be specified by the Allocation Tone Map, A(g,s)=1, if tone group g and slot s are assigned to request, else 0. This format can be very memory intensive and require higher signaling overhead. In Scheduler 3 embodiments, the BW Allocation may be specified by the Allocation Tone Map as in Scheduler #2 embodiments. Allocation size is limited by specifying tone "blocks" and limiting the number of tone blocks in an allocation.

A Tone Block may be defined as a 1-by-N vector where when the nth entry=1, the tone group n is included in this Block and when the nth entry=0, the tone group is not included in this block. Accordingly, all tone groups in a Block do NOT have to be contiguous. The maximum number of tone BLOCKS in allocation is limited to M in Sch-3 embodiments. The BW Allocation indicates for each time slot, which Blocks are active for the allocation. The same procedure may be used to specify Allocations in Scheduler 2 embodiments. In Scheduler #2 embodiments, num. blocks/allocation can be equal to the number of tones or tone groups. An example of the number of bytes required by this encoding procedure for a Sch-3 embodiment is shown below:

Block=1-by-N vector. $n^{th}$ entry=1 means tone group n is included; 0 means not included.

Tone groups in a block are not necessarily contiguous.

ceil(N/8) bytes to define each block. (e.g. N=37=>5 bytes)

Suppose M different blocks are used in an allocation. For each time slot, M bits are needed to indicate if any one or more of the blocks are used.

256 slots =>256*M/8=32*M bytes needed. (e.g. M=2 => 64 bytes)

Total=(define all $M$ blocks)+(specify which blocks used in each slot)=ceil($N$/8)*$M$+32*$M$ E.g. N=37, M=2=>5*2+32*2=74 bytes.

Some embodiments of the present invention may be better understood by a detailed description of particular embodiments that qualify as Scheduler 1 (Sch-1) embodiments. The objective of these Sch-1 embodiments is to define a simple approach to exploiting the frequency-selective nature of the BLEs for the channels between individual device pairs. Sch-1 embodiments are suitable for large BW connections that are continuously active, such as HDTV or SDTV or streaming IP applications. In Sch-1 embodiments, a single block allocation requirement prevents usage of smaller free blocks in a Tone MAP. These embodiments may be less efficient for bursty traffic with quiet periods.

In these particular Sch-1 embodiments, the BW Allocation is allocated as one contiguous block of tones/groups that meet the request. Guard tones may also need to be assigned between allocations made to different source devices based on the limitations of the PHY.

In these particular Sch-1 embodiments, the following symbols or terms will be defined as follows:

N=Number of tone groups. (Each tone group may have 1 tone or more, all groups have the same number of tones).

n_first=first tone group in the allocation. (1≦n_first≦N)

n_last=last tone group in the allocation. (1≦n_last≦N)

n_first <=n_last means allocate tone groups {n_first, n_first+1, ..., n_last}.

n_first>n_last means allocate tone groups {n_first, n_first+1, ..., N} and {1, 2, ..., n_last}.

An exemplary algorithm for a Sch-1 embodiment is shown in flow chart format in

Figure 2:
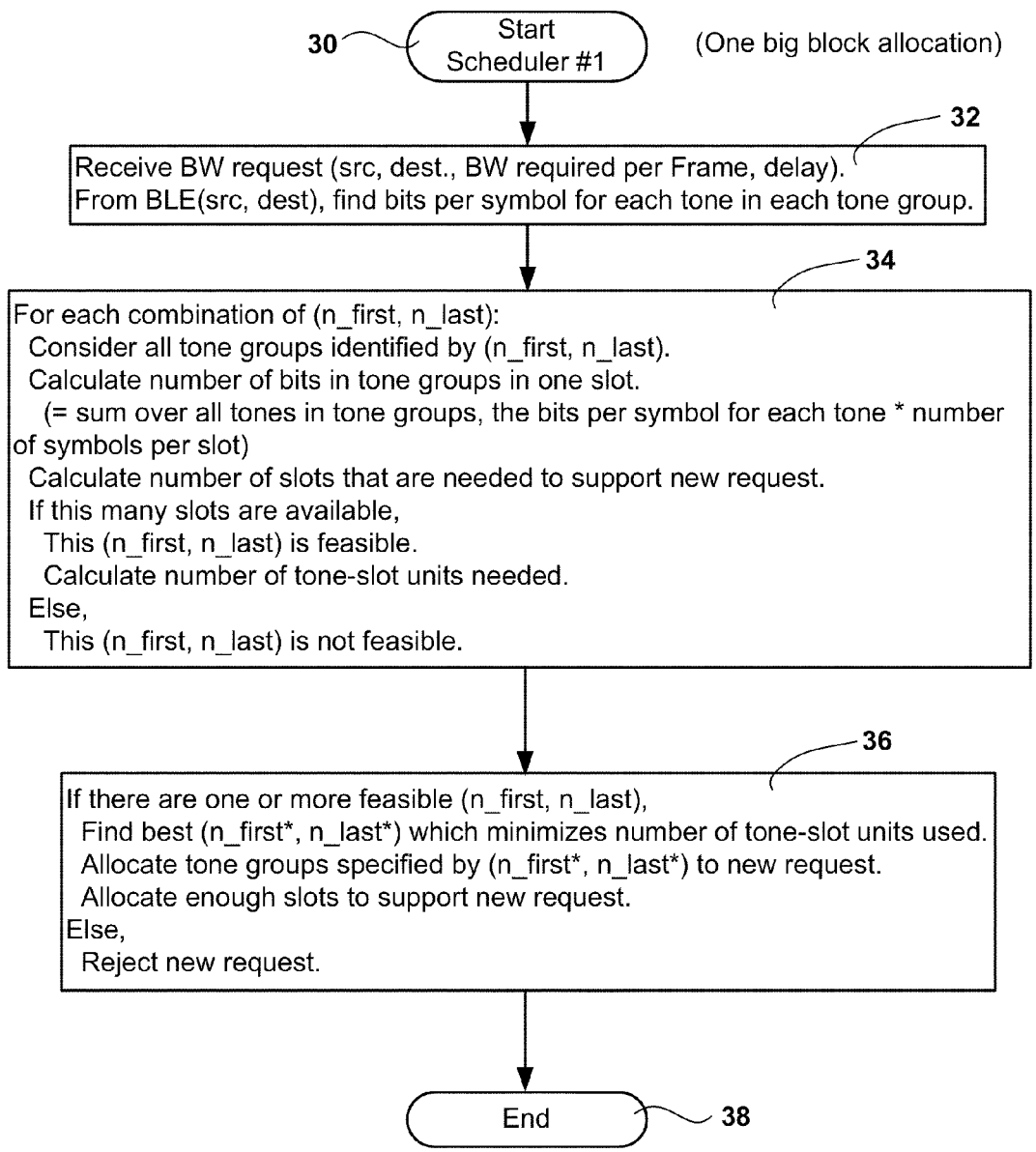
FIG. 2 is a flow chart showing an exemplary embodiment of a Scheduler 1 allocation method.

FIG. 2. In this embodiment, the scheduler is started 30 and a bandwidth request is received. The scheduler then obtains 32 a BLE for each tone in each tone group. The feasibility of each tone group is then determined 34 by a process that may comprise the following steps:

For each combination of (n_first, n_last), do:
  a. If n_first <=n_last, consider tone groups {n_first, n_first+1, ..., n_last}; Else if n_first>n_last, consider tone groups {n_first, n_first+1, ..., N} and {1, 2, ..., n_last}.
  b. Calculate number of bits in tone groups in one slot based on BLE for each outlet pair.
  c. Find out number of slots needed to support request.
  d. If this many slots are available, (n_first, n_last) is feasible and find out total number of tone-slot units needed.

If one or more feasible tone groups are found, the tone group or groups that minimize the number of tone-slot units are found and allocated 36 to the request according to the following steps:
  a. If no feasible (n_first, n_last), reject request.
  b. From the set of feasible pairs (n_first, n_last), choose the pair that uses fewest tone-slot units.
  c. Allocation is given by n_first* and n_last*, and allocate enough slots to support request.

If a feasible tone group is not found, the request will be rejected.

An example of an allocation made by a Scheduler 1 embodiment is shown in FIGS. 3A and 3B in a format similar to that of FIG. 1 with a vertical frequency or tone axis 2 plotted with a horizontal time slot axis 4. A reserved tone slot 18 is shown on the map as well. In these embodiments, a tone group is defined by first and last tones in the group (n_first* and n_last*). However, the order of these tones helps define the allocation.

When n_first* is less than n_last*, a tone group allocation as shown in FIG. 3A will be allocated. In this case, tone groups beginning at n_first* 40 and ending at n_last* 42 will be allocated in a single rectangular tone group allocation 44.

When n_first* is greater than n_last*, a tone group allocation as shown in FIG. 3B will be allocated. In this case, tone groups beginning at n_last* 42 and ending at n_first* 40 will be allocated in multiple rectangular tone group allocations 46a and 46b.

The Allocation made by Scheduler 1 embodiments is always a rectangular block. This makes the specification of the allocation easy. Sch-1 methods are applicable even when there are active allocations in the Tone Map. This condition may be addressed by feeding the algorithm a tone map which only shows the free tone groups.

In some Scheduler-2 embodiments, one objective is to find the "best allocation" for a BW request without any constraint on the allocation. "Best" may be defined as the allocation that uses the minimum tone-timeslots from the Tone-Slot Map.

Some Sch-2 embodiments may have constraints applied to BW selection, however, in most cases, these embodiments may select any suitable tone groups and time slots (i.e., no constraints on number or location of the tones and slots). Furthermore, tone groups do not need to be contiguous. In some embodiments, guard tones and guard time slots may need to be assigned between allocations made to different source devices based on the limitations of the PHY.

Figure 4:
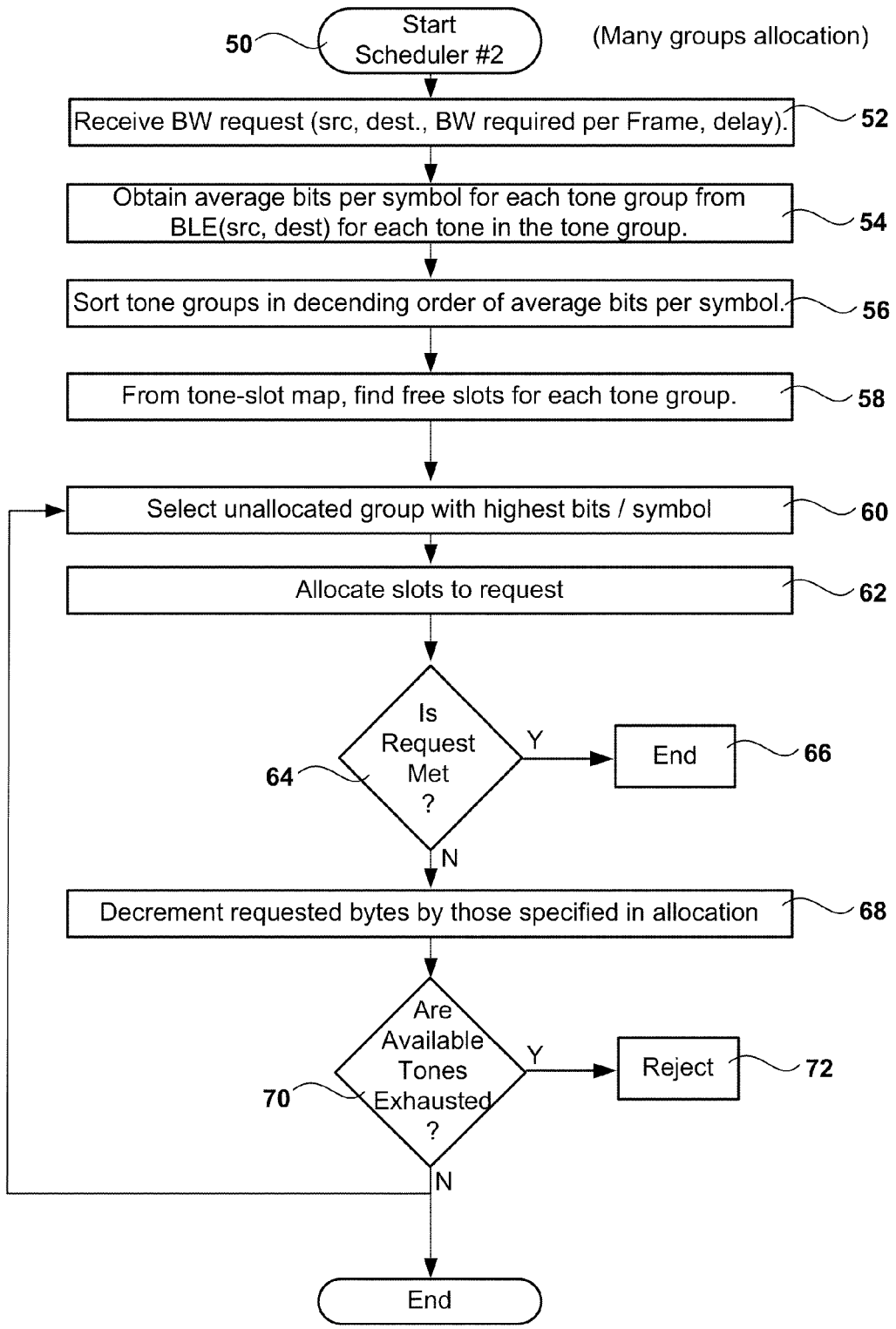
FIG. 4 is a flow chart showing an exemplary embodiment of a Scheduler 2 allocation method.

An exemplary algorithm for a Sch-2 embodiment is shown in flow chart form as FIG. 4. In this embodiment the scheduler is started 50 and a BW request is received 52. The average bits per symbol is then obtained from the BLE 54 for each tone in the tone group. The tone groups are then sorted 56. This sorting may be performed in descending order of average bits per symbol. In some embodiments, tone groups may be sorted in descending order of average modulation density obtained from BLE (Source, destination) of each tone in the group. The average modulation density of a tone group may be expressed as the sum of the BLEs for all tones in the group divided by the number of tones in the group.

Free slots for each tone group are then located 58 on the tone map. Once available slots are found, they may be allocated. Slots in the tone group having the highest average bits per symbol are typically allocated first. Generally, the unallocated (initially all groups are unallocated) tone group with the highest average bits per symbol is selected 60. Tone slots in this group are allocated to the request 62. If the BW request is satisfied 64, the process may end 66. If the BW request is not satisfied 64, number of bytes in the request is decremented 68 by the amount allocated in the previous cycle 62. At this point, the available tones may be checked 70 to see if they have been exhausted. If so, the request may be rejected 72. If the tones are not exhausted, the routine may cycle back to group selection 60 and the unallocated group with the next highest bit per symbol ratio may be selected and allocated as described above.

For these embodiments, if a delay value is also specified in the request (e.g. for real-time application), then only time slots that occur before expiration of the delay can be used in the BW allocation. This constraint is applicable only if the delay is $\leq 1$ Frame duration. Sch-2 embodiments can account for this delay constraint.

Figure 5:
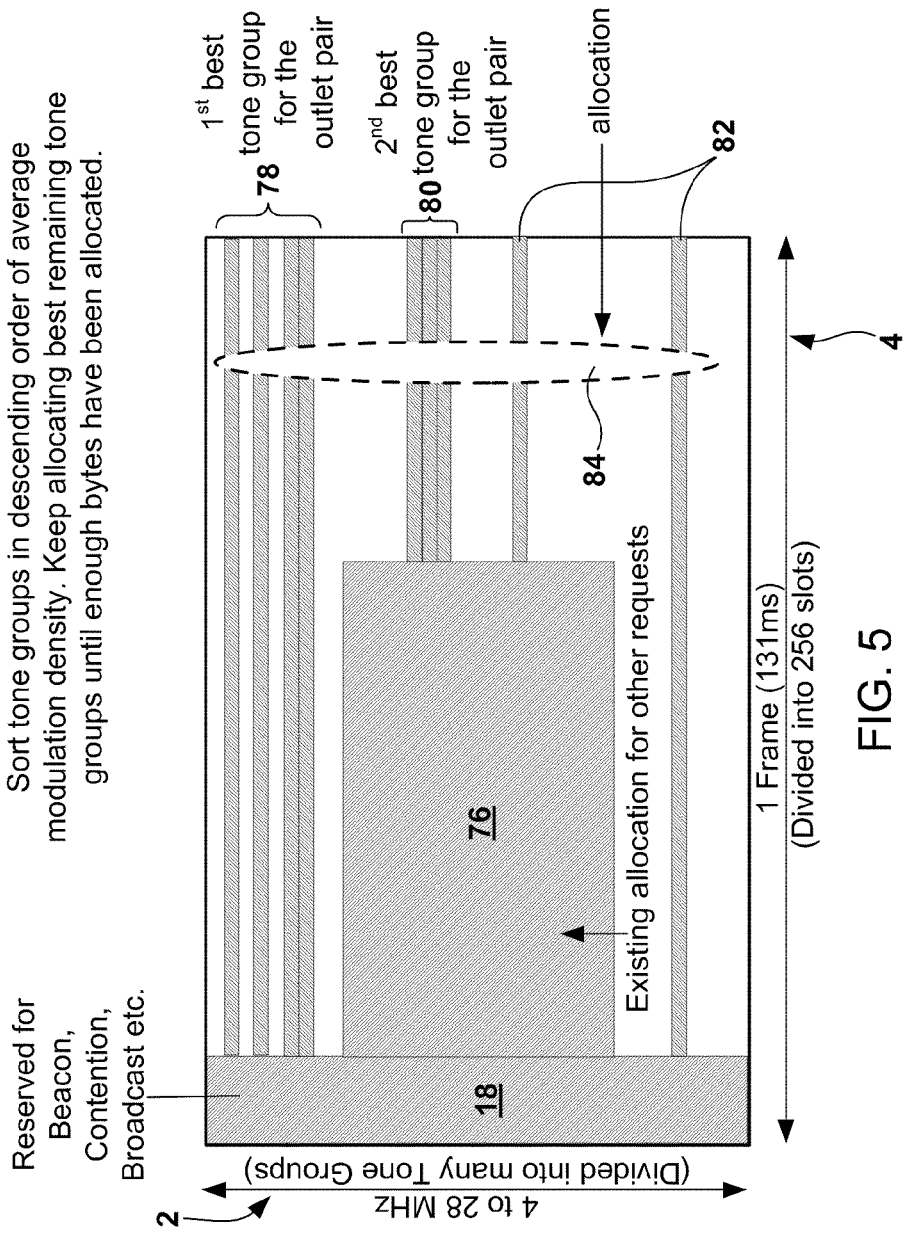
FIG. 5 is a diagram illustrating an exemplary Scheduler 2 allocation without a delay requirement.

Some Sch-2 embodiments may perform allocations for requests without a time delay. These allocations may be granted as shown in FIG. 5, which is a tone map for the allocation. In these cases, an existing allocation 76 may have been previously granted. Tone groups have been sorted into a $1^{st}$ best tone group 78, a $2^{nd}$ best tone group 80 and next best tone groups 82. When the request requires, all these groups will be allocated 84 for the entire frame.

Figure 6:
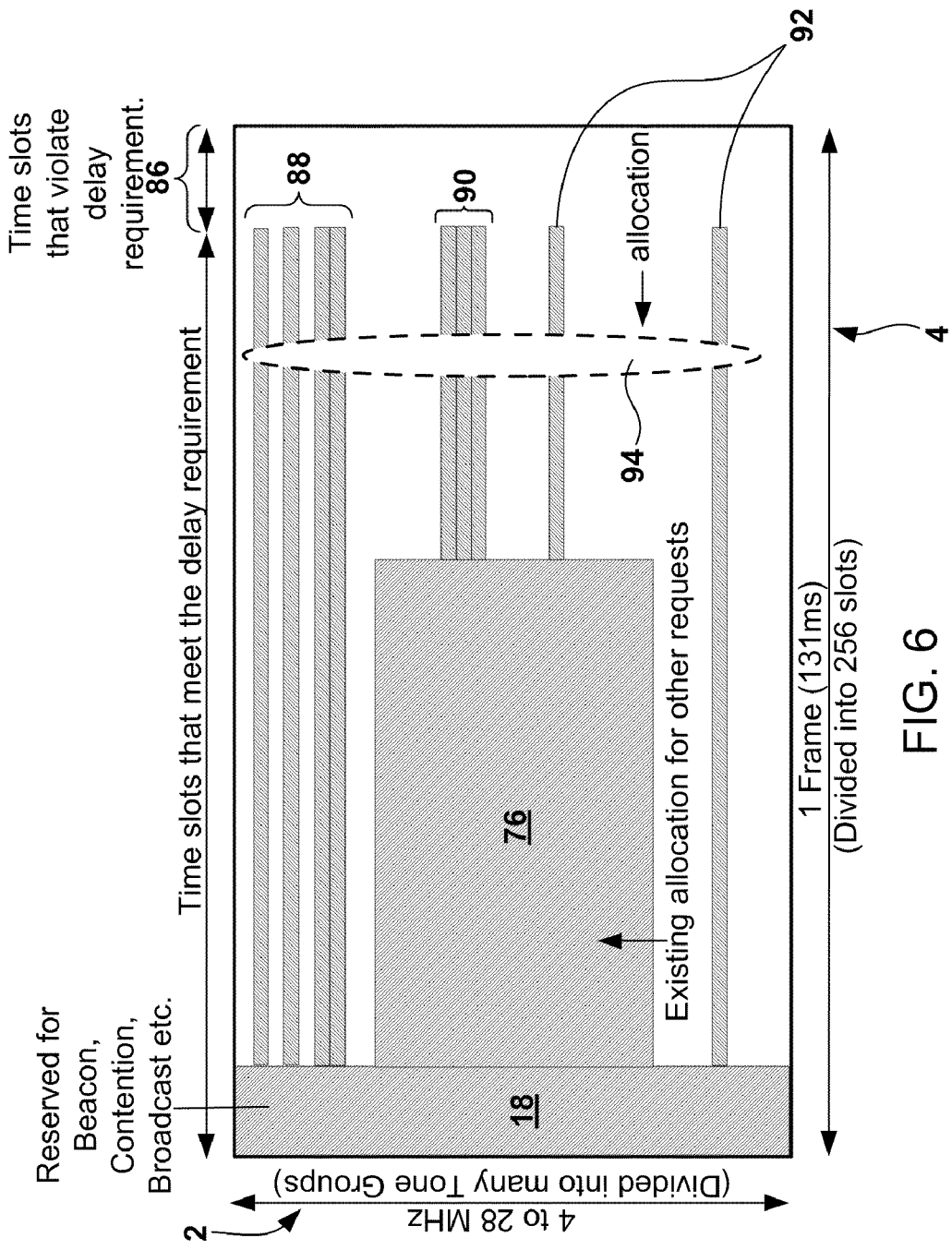
FIG. 6 is a diagram illustrating an exemplary Scheduler 2 allocation with a delay requirement.

Some Sch-2 embodiments may perform allocations for requests with a time delay requirement. These allocations may be granted as shown in FIG. 6, which is a tone map for the time-delay allocation. In these cases, an existing allocation 76 may have been previously granted. Tone groups have been sorted into a $1^{st}$ best tone group 88, a $2^{nd}$ best tone group 90 and next best tone groups 92. When the request requires, all these groups will be allocated 94 for the unallocated slots in these groups up until the time slot 86 when the delay constraint precludes their use.

Some Sch-2 embodiments are close to "single request optimal" because the best tone groups are allocated one by one until a data rate requirement is met (i.e., for the case where Num Tone/Group>1). Some Sch-2 embodiments are truly "single request optimal" if there is 1 tone in each tone group.

Some Sch-2 embodiments may not be globally optimal in the sense of maximizing total data rate. The allocations for Sch-2 embodiments may comprise a large number of "tone blocks". The large size of the allocation may increase protocol (signaling) overhead significantly as well the memory requirements in the device.

Embodiments of the present invention described as Schedule-3 embodiments are typically designed to find the a "superior" tone-slot allocation while the allocation is constrained by the number of "blocks" in it. In some embodiments, a "superior" allocation may be defined as the allocation that uses a lesser or minimum quantity of tone groups or timeslots from the Tone-Slot Map.

In addition to the assumptions and constraints that have been described above for other exemplary schedulers, an additional constraint on the number of blocks in the allocation is placed on Sch-2 embodiments to arrive at an exemplary Sch-3 algorithm. Hence, an exemplary Sch-3 embodiment may have the following constraints:

Tone group allocations specified in terms of "BLOCKS"
Block=1-by-N vector, wherein nth entry=1 means tone group n is allocated; 0 means not allocated.
Number of BLOCKS in Allocation specification limited to say, M blocks. i.e., An allocation can have only M 1×N vectors specifying tone groups.
Optional constraint: All allocated tone groups in a block must be contiguous. This is an optional restriction.

Scheduler 3 embodiments may be extensions of Sch-2 embodiments that handle the constraint of using a fixed maximum number of blocks (≦M blocks) in an allocation. This restriction on the number of blocks forces the scheduler to find contiguous tone group-time slot allocations. The BW Allocations made by Sch-3 embodiments result in a less "fragmented" Tone MAP.

The creation of numerous non-adjacent regions of used and un-used tones and time slots is called fragmentation of the TM. Fragmentation occurs when a single allocation uses non-contiguous tone groups and time slots. As a result of the limited size of the BW allocation specification, Sch-3 Allocations require less memory in HW and Sch-3 Allocations require less signaling overhead. Protocols may also restrict transmission of an entire tone Map for each request (i.e., Avalanche PLC has a 4 block/Allocation restriction) and this is another reason for applying Sch-3 embodiments.

When an allocation consists of non contiguous tones and time slots, most multi-tone PHY systems require guard times and guard slots to be assigned between adjacent allocations. As fragmentation increases, BW allocations consist of increasingly non-adjacent tone groups and time slots. This additional overhead from guard tones and guard time slots between groups and slots assigned to different allocations can consume a significant portion of the available capacity and thus drastically reduce capacity utilization.

Fragmented tone maps also reduce the network's ability to support half duplex operation (where devices cannot transmit and receive at same time). Fragmentation results in fewer available slots and groups for half duplex operations. Finally, in most multi-tone PHYs, the preambles for each allocated tone group must be slot aligned. Fragmentation of the Tone Map makes it harder to find tone groups that can be aligned. This reduces the chance of finding a suitable BW allocation to satisfy the request and leads to a high request blockage probability, even though there is available capacity in the system.

Embodiments of the present invention may use a Basic Usage Pattern (BUP), which may take the form of a 1-by-n row vector (in some embodiments n=256), with entries=0 or 1 (0=used; 1=free). A BUP may also comprise the following characteristics:

$t^{th}$ entry of a BUP indicates whether slot t is free for the particular tone group or not.
Each tone group has a BUP, given by initial tone-slot map.
From BUPs of all tone groups, obtain $S_B$, which is the set of all unique BUPs.
Also, find out $G_B(a)$, which is the set of tone groups that belong to BUP a.
u, v in $S_B$, u≠v=⇒$G_B(u) \cap G_B(v)$ Ø

Figure 7:
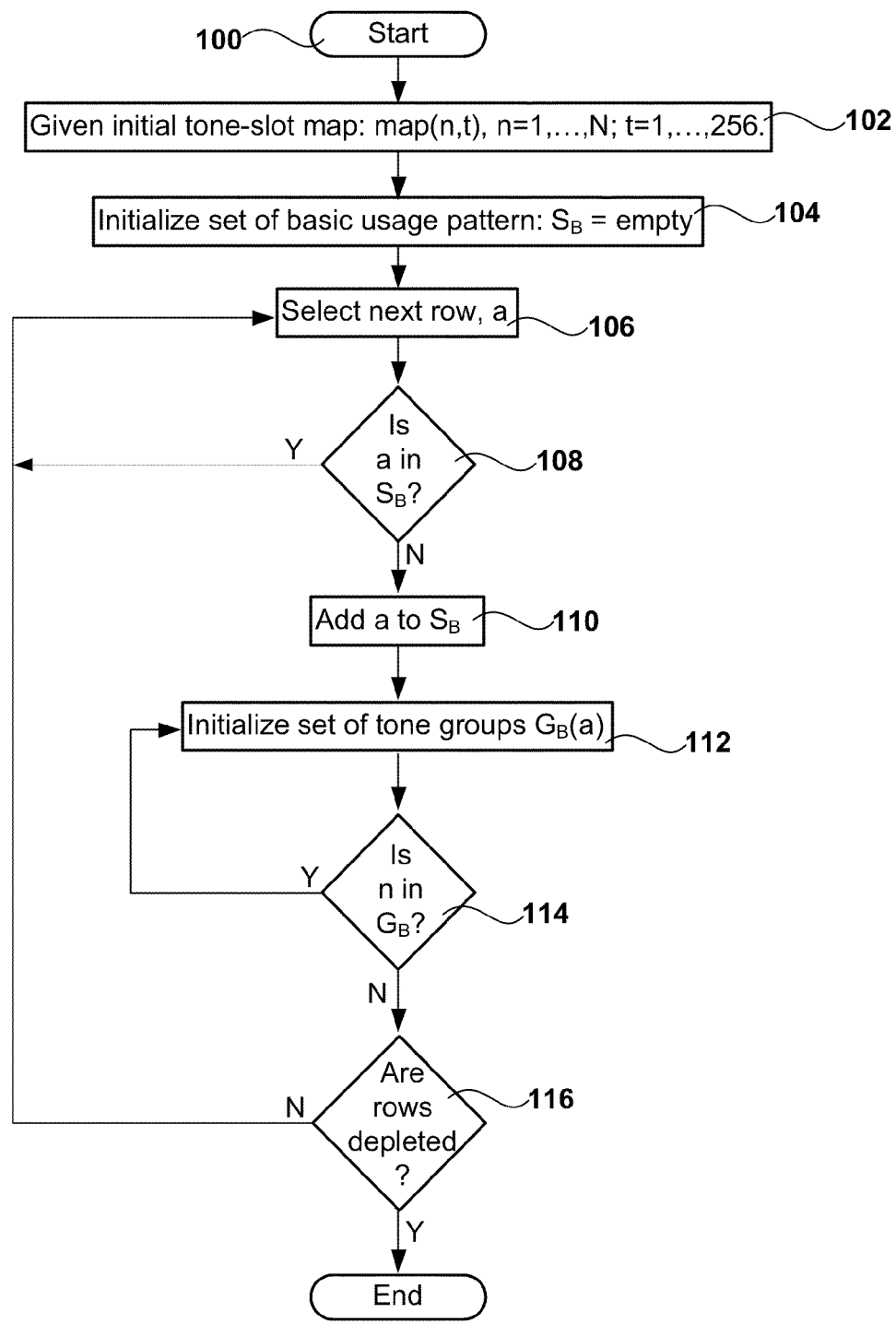
FIG. 7 is a flow chart showing an exemplary method for finding basic usage patterns.

In some embodiments, an algorithm to find $S_B$ (set of unique BUPs) and $G_B(a)$ (set of tone groups that belong to basic usage pattern a) may be used. This algorithm is shown in FIG. 7. To find $S_B$, the algorithm is started 100 and applied to an initial tone-slot map 102. An initial set of BUPs is initialized as empty 104. Each row of the tone-slot map is then analyzed 106 and compared to the row patterns stored in $S_B$. If the current row is not contained in $S_B$, it's pattern will be added 110. This will occur for each row in the tone map.

The same process is followed for each tone group. An initial set of tone groups, GB, is initialized as empty 112 and each unique tone group is added 114 to the set. This process is repeated until all tone groups in the map are accounted for.

The BUPs of embodiments of the present invention may be further described with reference to FIG. 8, which is a diagram comprising a tone map. Like other tone maps in this specification, the map portion of this diagram comprises a vertical axis 2 representing frequency divided into tone groups. The horizontal axis 4 represents time and is divided into time slots. In this map, a reserved region 18 is shown that is not available for allocation to devices. Portions of the map that have been previously allocated are shown as existing allocations 96. The remainder of the map is allocated for present use. The table to the right of the tone map shows the BUPs as binary strings 120 along with their BUP identifiers ($a_1$ to $a_3$) 98. Tone group numbers 122 ranging from #1 to #12 are also shown to the right of the tone map. On this map, three basic usage patterns (BUPs) ($a_1$, $a_2$ & $a_3$) 98 are identified. A first BUP 124, with BUP identifier $a_1$, is found in the first 4 tone groups (rows) of the tone map. This first BUP 124 is defined as using all time slots except those allocated to the reserved region 18 and the existing allocation 96a. As shown on the map of FIG. 8, this is time slots c-n and r-t. This pattern repeats for the first four tone groups (#1-#4).

In the $5^{th}$ tone group, a second BUP 126, with BUP identifier $a_2$, is identified. This second BUP uses all time slots except those allocated to the reserved region 18. This is time slots c-t. This BUP reoccurs in tone groups #10, #11 and #12.

A third BUP 128, with BUP identifier $a_3$ is identified in tone group #6. This BUP uses all time slots except those allocated to the reserved region 18 and an existing allocation 96b. As shown in the map of FIG. 8, this is time slots c-e and j-t.

Figure 8:
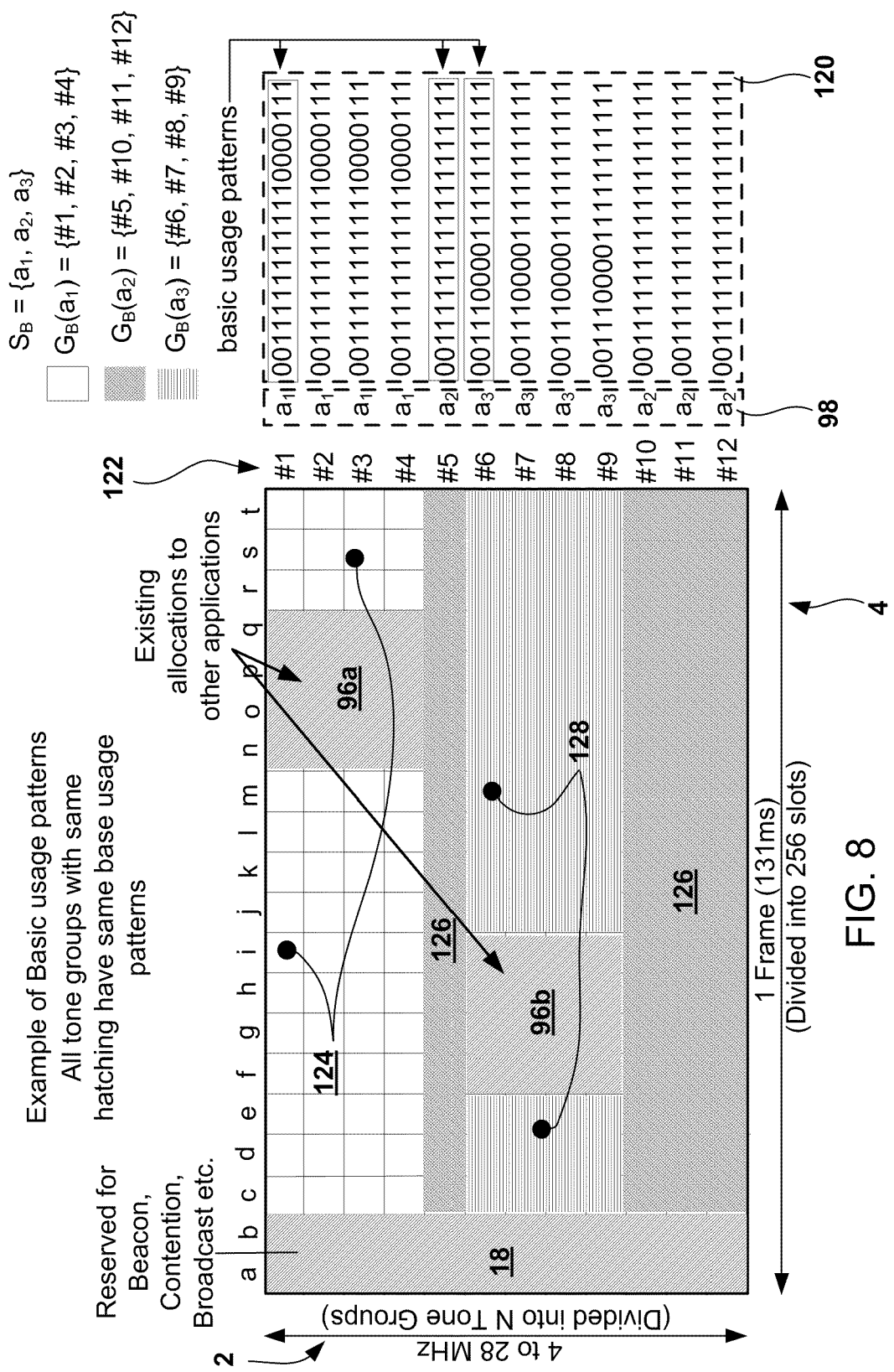
FIG. 8 is a diagram illustrating basic usage patterns on a tone map.

In FIG. 8, the table to the right of the tone map shows a column 98 with BUP identifiers ($a_1$, $a_2$ & $a_3$) and a column 120 showing each BUP as a binary string with a bit for each time slot. Time slots that are allocated to a device are designated as allocated with the symbol 1 and designated as unallocated with the symbol 0.

Figure 9:
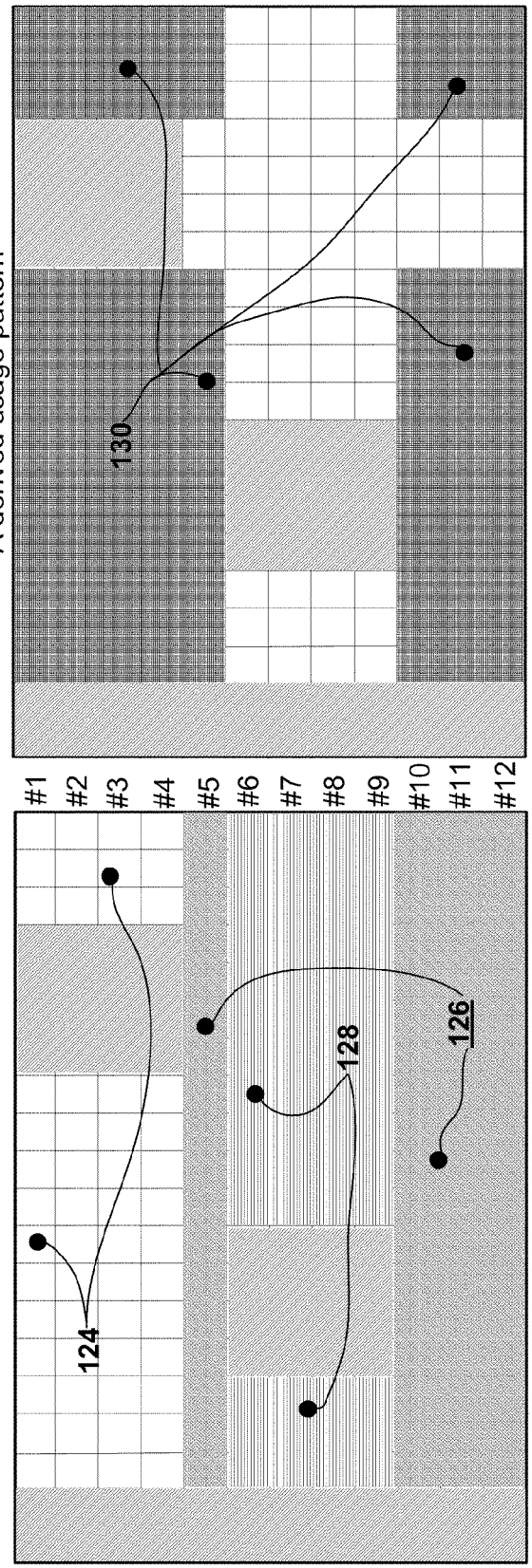
FIG. 9 is a diagram illustrating basic usage patterns and a derived usage pattern on tone maps.

Embodiments of the present invention may use a Derived Usage Pattern (DUP). The M-block limit in a BW allocation implies that Sch-3 can allocate tone groups from at most M basic usage patterns. However, allocating tone groups from only M BUPs may not satisfy the data rate of a request due to inadequate capacity in these M BUPs. To solve this problem, several BUPs may be combined to form a Derived Usage Pattern (DUP), and pool their tone groups together. A Derived Usage Pattern may be obtained by the logical operation of AND-ing one or more BUPs. The resulting DUP need not be unique. A DUP may have the following characteristics:

Use common available slots of several BUPs, and use all their tone groups.
Number of DUPs=$2^{(number\ of\ BUPs)}-1$ In an exemplary DUP 130, the DUP may comprise two BUPs ($d_4 = a_1$ AND $a_2$) 124 & 126 as shown in FIG. 9. This example indicates how the number of free tone-slots can be increased through the coalescing operation of the DUP. With one block only, the number of free Bytes ($d_4$)>free Bytes ($a_1$) or free Bytes ($a_2$). In this exemplary DUP 130, the time slots common to BUP $a_1$ 124 and BUP $a_2$ 126 (slots c-m and r-t) are combined for all 8 tone groups of the two BUPs 124 & 126 as one DUP 130 allocation. As can be seen from the map of FIG. 9, more bandwidth is allocated with the single DUP than either of the BUPs 124 & 126 used to form the DUP.

Figure 10:
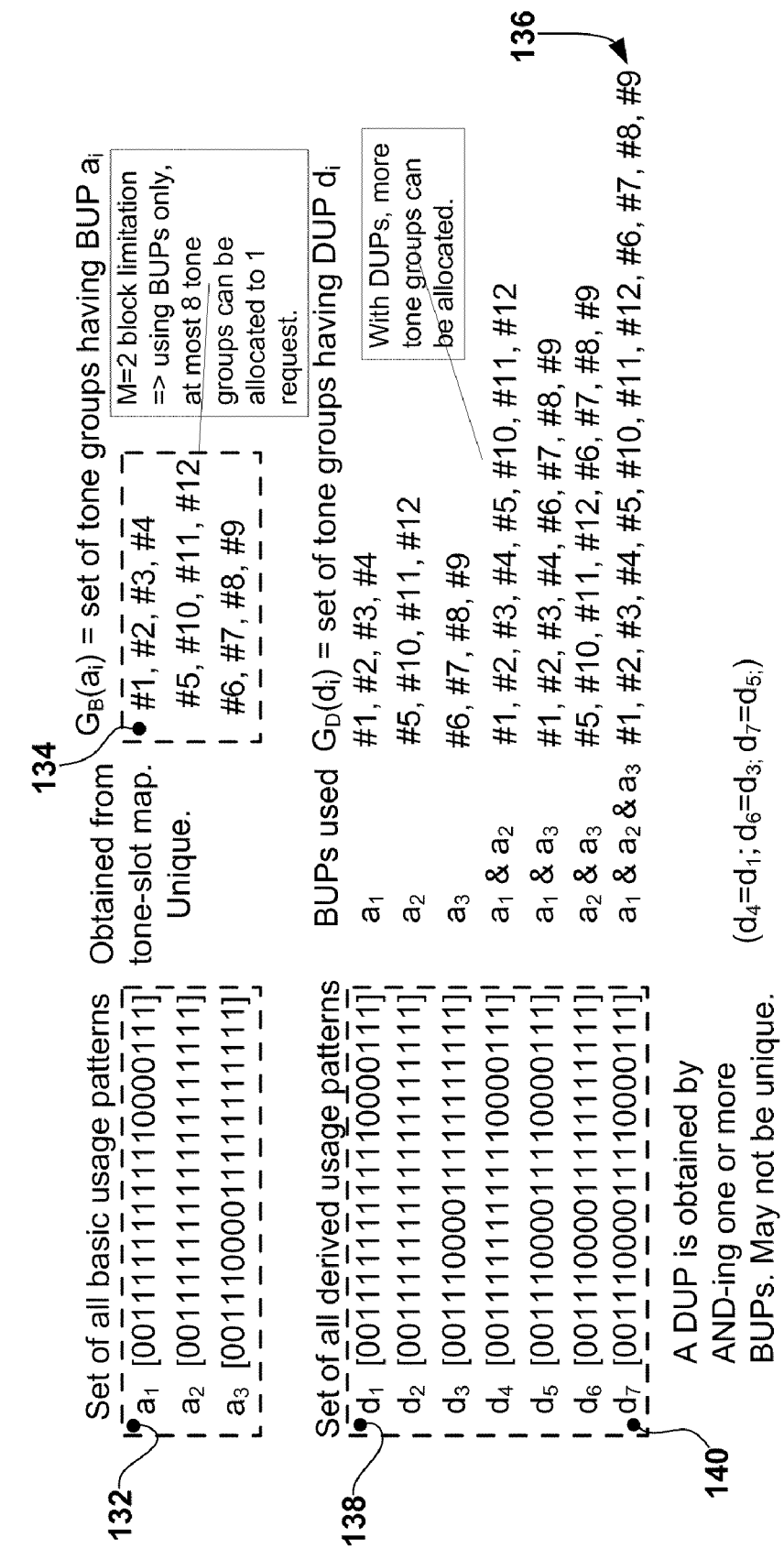
FIG. 10 is a diagram illustrating the relative capacity of basic usage patterns and a derived usage pattern.

It may be further noted, in this example as shown in FIG. 10, that the set of BUPs 132 allows only 4 tone groups 134 to be allocated for each BUP. In this same example, a single DUP 140, among the 7 possible DUPs 138 may be used to allocate as many as all 12 of the tone groups 136 (although some will have fewer available time slots).

Some Sch-3 embodiments typically comprise two main functions—fun_bup( ) and fun_dup( ). In an exemplary embodiment, fun_bup( ) uses basic usage patterns only in making the BW Allocation. The Sch-3 scheduler allocates tone groups from ≦M BUPs to satisfy the constraint on the number of tone groups in the allocation. fun_dup( ) uses DUPs in the Allocation (a BUP is by definition a DUP, but a DUP is not necessarily a BUP). Fun_dup( ) allocates tone groups from ≦M DUPs and this satisfies the constraint on the size of the allocation. Since fun_bup and fun_dup both use at most M basic or derived usage patterns this implies that the BW allocation is made up of at most M blocks.

Figure 11:
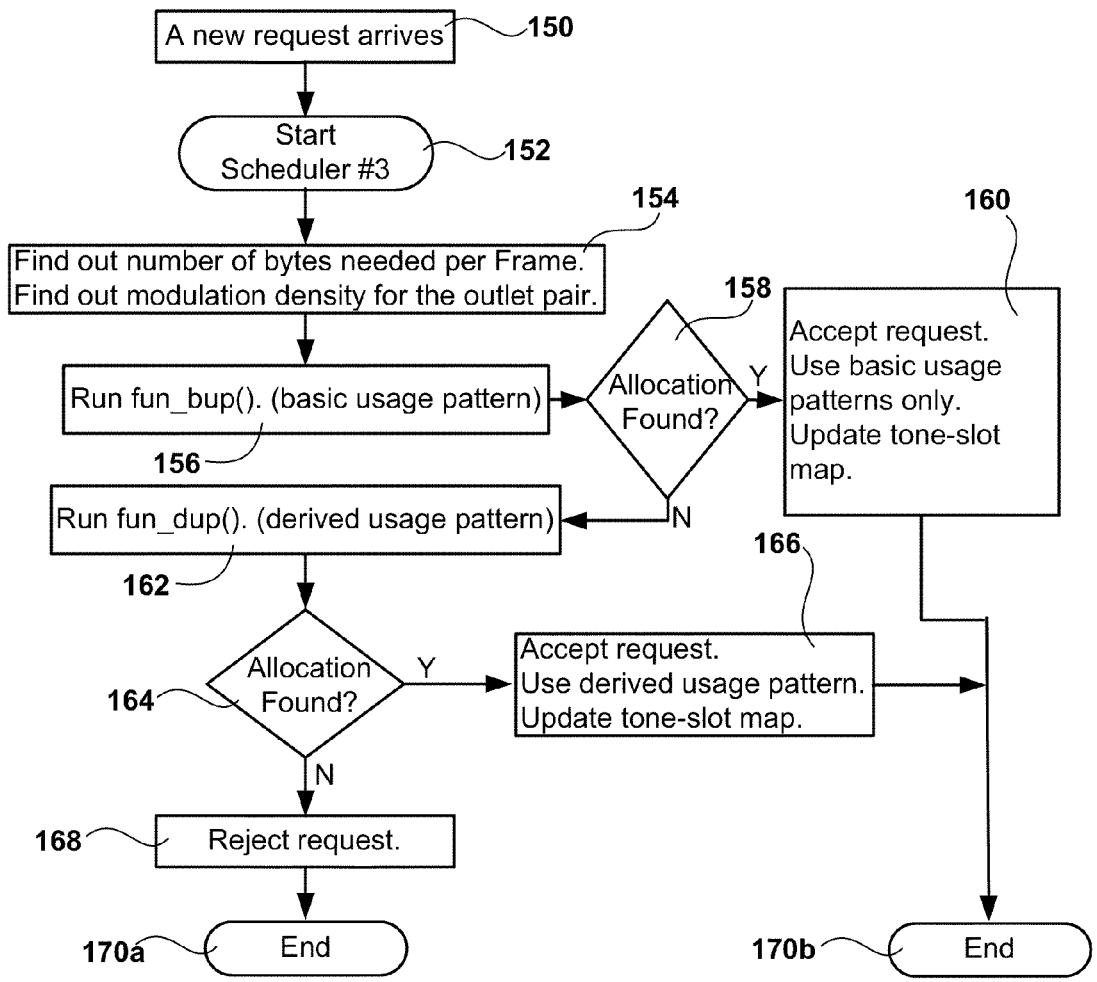
FIG. 11 is a flow chart showing an exemplary allocation method for a Scheduler 3 embodiment.

FIG. 11 shows an exemplary algorithm for some Sch-3 embodiments. In these embodiments, a request 150 is received by the scheduler, which then starts 152 the search for available bandwidth. This exemplary scheduler will determine the number of bytes needed per frame and the modulation density required for the outlet pair 154. This Sch-3 embodiment first attempts to satisfy a BW request 150 by computing and examining BUPs using the function fun_bup 156. If an allocation is found 158, the request is accepted and fulfilled using BUPs only 160 and the tone map is updated. When this occurs, the process is terminated 170*b*.

If an allocation is not possible using BUPs then the scheduler will compute and examine the DUPs based on all the BUPs computed by fun_bup. The allocation using DUPs is made through the function fun_dup 162. If an allocation is found using DUPs 164, the request is accepted and allocated with DUPs 166 and the tone map is updated. The process will then be terminated 170*b*.

If no allocation can be found using fun_bup 158 or fun_dup 164 the request is rejected 168 and the process terminates 170*a*.

Figure 12:
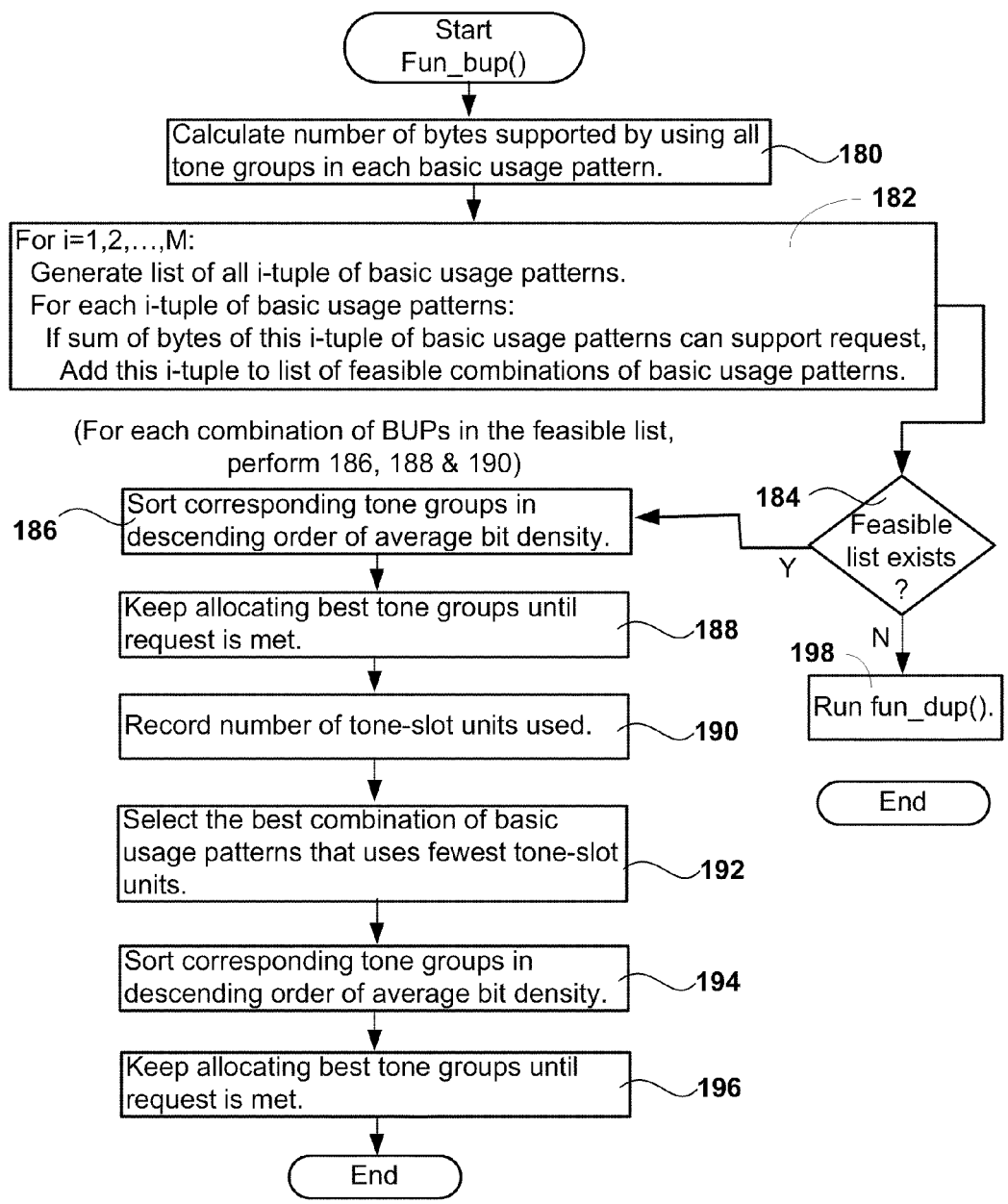
FIG. 12 is a flow chart showing an exemplary method for allocating bandwidth with basic usage patterns.

An exemplary fun_bup( ) function for which a flowchart is shown in FIG. 12, may be performed with the following steps:
 Calculate number of bytes that can be supported by using all tone groups in each BUP 180.
 Find list of all combinations of BUPs that can support request, assuming ≦M BUPs can be used 182.
 If a feasible list does not exist 184,
  Exit and run fun_dup( ) 198.
 Else,
 For each feasible combination of BUPs in the list:
  Sort corresponding tone groups in descending order of average bit density 186.
  Keep allocating best remaining tone groups until request is met 188.
  Record number of tone-slot unit used 190.
  Select best combination of BUPs that uses fewest tone-slot units 192.
  Sort corresponding tone groups in descending order of average b it density 194.
  Allocate best tone groups until request is met 196.

Figure 13:
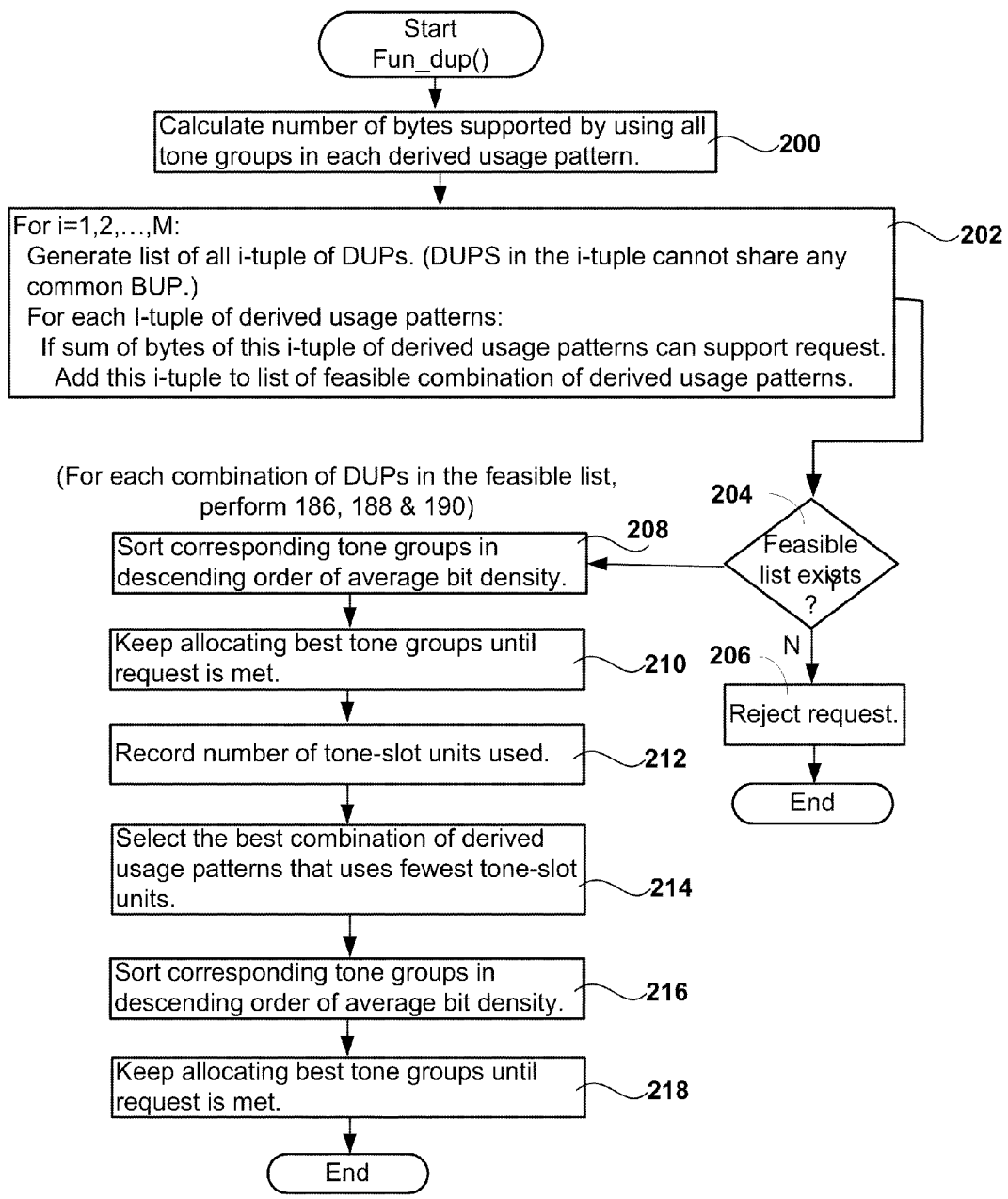
FIG. 13 is a flow chart showing an exemplary method for allocating bandwidth with derived usage patterns.

An exemplary fun_dup( ) function, for which a flowchart is shown in FIG. 13, may be performed with the following steps:
 Calculate number of bytes that can be supported by using all tone groups in each DUP 200.
 Find list of all combinations of DUPs that can support request, assuming ≦M DUPs can be used 202.
 Note: Consider only DUPs which do not share the same BUP.
 If a feasible list does not exist 204,
 Reject request 206.
 Else,
 For each feasible combination of DUPs:
  Sort corresponding tone groups in descending order of average bit density 208.
  Keep allocating best remaining tone groups until request is met 210.
  Record number of tone-slot unit used 212.
  Select best combination of DUPs that uses fewest tone-slot units 214.
  Sort corresponding tone groups in order of descending bit density 216.
  Allocate best tone groups until request is met 218.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for partitioning bandwidth in a communication medium, said method comprising:
 a) dividing bandwidth into a plurality of tone groups;
 b) dividing said tone groups into time slots;
 c) estimating a Bit Loading Estimate (BLE) for each of said tone groups;
 d) determining Basic Usage Patterns (BUPs) for a device pair with a BUP processor comprising a processor and a memory;
 e) searching for BUP combinations that will provide sufficient bandwidth to fulfill a request for said device pair;
 f) if said searching is successful,
  i) calculating the number of BUP tone-slot units required to satisfy said request for each of said BUP combinations, when the tone groups are allocated in order of highest to lowest BLE,
  ii) selecting a final BUP combination, from among said combinations, and
  iii) allocating said final combination to said request;
 g) if said searching for BUP combinations is not successful,
  i) determining Derived Usage Patterns (DUPs) for said BUPs with a DUP processor comprising a processor and a memory;
  ii) estimating a Bit Loading Estimate (BLE) for each of said DUPs;
  iii) searching for DUP combinations that will provide sufficient bandwidth to fulfill said request for said device pair;
  iv) if said searching for DUP combinations is successful,
   (1) calculating the number of DUP tone-slot units required to satisfy said request for each of said combinations, when the tone-slot units are allocated in order of highest to lowest BLE,
   (2) selecting a final DUP combination, from among said DUP combinations;

(3) allocating said final DUP combination to said request.

2. A method as described in claim 1 wherein said BUP tone slot units are allocated in order of highest to lowest BLE.

3. A method as described in claim 1 wherein said DUP tone slot units are allocated in order of highest to lowest BLE.

4. A method as described in claim 1 wherein said final BUP combination uses the lowest number of tone-slot units.

5. A method as described in claim 1 wherein said final DUP combination uses the lowest number of tone-slot units.

6. A method as described in claim 1 wherein said determining BUPs comprises identifying allocated and reserved areas in an initial tone-slot map and analyzing successive rows of a tone slot map to identify unique row patterns.

7. A method as described in claim 1 wherein said determining DUPs comprises using all tone groups of BUPs with common available slots.

8. A method as described in claim 1 wherein said determining DUPs comprises logically AND-ing a plurality of said BUPs.

9. A method for allocating bandwidth in a computer network, said method comprising:
   a) receiving a request for bandwidth over a joint-frequency-and-time-divided medium, wherein said medium is divided into tone groups and time slots;
   b) estimating a Bit Loading Estimate (BLE) for each of said tone groups;
   c) determining Basic Usage Patterns (BUPs) for said request with a BUP processor comprising a processor and a memory;
   d) finding combinations of said BUPs;
   e) calculating the number of tone-slot units required to satisfy said request, for each of said combinations;
   f) selecting a final combination, from among said combinations; and
   g) allocating said final combination to said request wherein said tone groups are allocated in order of highest to lowest BLE.

10. A method for allocating bandwidth in a computer network, said method comprising:
    a) receiving a request for bandwidth over a joint-frequency-and-time-divided medium, wherein said medium is divided into tone groups and time slots;
    b) estimating a Bit Loading Estimate (BLE) for each of said tone groups;
    c) determining Basic Usage Patterns (BUPs) for said request with a BUP processor comprising a processor and a memory;
    d) finding combinations of said BUPs;
    e) calculating the number of tone-slot units required to satisfy said request, for each of said combinations;
    f) selecting a final combination, from among said combinations; and
    g) allocating said final combination to said request wherein said final combination uses the lowest number of tone-slot units.

11. A method for allocating bandwidth in a computer network, said method comprising:
    a) receiving a request for bandwidth over a joint-frequency-and-time-divided medium, wherein said medium is divided into tone groups and time slots;
    b) estimating a Bit Loading Estimate (BLE) for each of said tone groups;
    c) determining Basic Usage Patterns (BUPs) for said request with a BUP processor comprising a processor and a memory, wherein said determining BUPs comprises identifying allocated and reserved areas in an initial tone-slot map and analyzing successive rows of a tone slot map to identify unique row patterns;
    d) finding combinations of said BUPs;
    e) calculating the number of tone-slot units required to satisfy said request, for each of said combinations;
    f) selecting a final combination, from among said combinations; and
    g) allocating said final combination to said request.

12. A method for allocating bandwidth in a computer network, said method comprising:
    a) receiving a request for bandwidth over a joint-frequency-and-time-divided medium, wherein said medium is divided into tone groups and time slots;
    b) estimating a Bit Loading Estimate (BLE) for each of said tone groups;
    c) determining Basic Usage Patterns (BUPs) for said request with a BUP processor comprising a processor and a memory;
    d) finding combinations of said BUPs using all tone groups of BUPs with common available slots;
    e) calculating the number of tone-slot units required to satisfy said request, for each of said combinations;
    f) selecting a final combination, from among said combinations; and
    g) allocating said final combination to said request.

13. A method for allocating bandwidth in a computer network, said method comprising:
    a) receiving a request for bandwidth over a joint-frequency-and-time-divided medium, wherein said medium is divided into tone groups and time slots;
    b) estimating a Bit Loading Estimate (BLE) for each of said tone groups;
    c) determining Basic Usage Patterns (BUPs) for said request with a BUP processor comprising a processor and a memory;
    d) finding combinations of said BUPs by logically AND-ing a plurality of said BUPs;
    e) calculating the number of tone-slot units required to satisfy said request, for each of said combinations;
    f) selecting a final combination, from among said combinations; and
    g) allocating said final combination to said request.

14. A method for partitioning bandwidth in a communication medium, said method comprising:
    a) dividing bandwidth into a plurality of tone groups;
    b) dividing said tone groups into time slots;
    c) estimating a Bit Loading Estimate (BLE) for each of said tone groups;
    d) determining Basic Usage Patterns (BUPs) for a device pair with a BUP processor comprising a processor and a memory;
    e) finding BUP combinations that will provide sufficient bandwidth to fulfill a request for said device pair;
    f) calculating the number of tone-slot units required to satisfy said request for each of said combinations;
    g) selecting a final combination, from among said combinations; and
    h) allocating said final combination to said request, wherein said tone groups are allocated in order of highest to lowest BLE.

15. A method for partitioning bandwidth in a communication medium, said method comprising:
    a) dividing bandwidth into a plurality of tone groups;
    b) dividing said tone groups into time slots;
    c) estimating a Bit Loading Estimate (BLE) for each of said tone groups;

d) determining Basic Usage Patterns (BUPs) for a device pair with a BUP processor comprising a processor and a memory;
e) finding BUP combinations that will provide sufficient bandwidth to fulfill a request for said device pair;
f) calculating the number of tone-slot units required to satisfy said request for each of said combinations;
g) selecting a final combination, from among said combinations, wherein said final combination uses the lowest number of tone-slot units; and
h) allocating said final combination to said request.

16. A method for partitioning bandwidth in a communication medium, said method comprising:
a) dividing bandwidth into a plurality of tone groups;
b) dividing said tone groups into time slots;
c) estimating a Bit Loading Estimate (BLE) for each of said tone groups;
d) determining Basic Usage Patterns (BUPs) for a device pair with a BUP processor comprising a processor and a memory, wherein said determining BUPs comprises identifying allocated and reserved areas in an initial tone-slot map and analyzing successive rows of a tone slot map to identify unique row patterns;
e) finding BUP combinations that will provide sufficient bandwidth to fulfill a request for said device pair;
f) calculating the number of tone-slot units required to satisfy said request for each of said combinations;
g) selecting a final combination, from among said combinations; and
h) allocating said final combination to said request.

17. A method for partitioning bandwidth in a communication medium, said method comprising:
a) dividing bandwidth into a plurality of tone groups;
b) dividing said tone groups into time slots;
c) estimating a Bit Loading Estimate (BLE) for each of said tone groups;
d) determining Basic Usage Patterns (BUPs) for a device pair with a BUP processor comprising a processor and a memory;
e) finding BUP combinations that will provide sufficient bandwidth to fulfill a request for said device pair, wherein said finding BUP combinations comprises using all tone groups of BUPs with common available slots;
f) calculating the number of tone-slot units required to satisfy said request for each of said combinations;
g) selecting a final combination, from among said combinations; and
h) allocating said final combination to said request.

18. A method for partitioning bandwidth in a communication medium, said method comprising:
a) dividing bandwidth into a plurality of tone groups;
b) dividing said tone groups into time slots;
c) estimating a Bit Loading Estimate (BLE) for each of said tone groups;
d) determining Basic Usage Patterns (BUPs) for a device pair with a BUP processor comprising a processor and a memory;
e) finding BUP combinations that will provide sufficient bandwidth to fulfill a request for said device pair, wherein said finding BUP combinations comprises logically AND-ing a plurality of said BUPs;
f) calculating the number of tone-slot units required to satisfy said request for each of said combinations;
g) selecting a final combination, from among said combinations; and
h) allocating said final combination to said request.

* * * * *